United States Patent
Lentz (10) Patent No.: US 7,373,608 B2
(45) Date of Patent: May 13, 2008

(54) APPARATUS, SYSTEM AND METHOD OF PROVIDING FEEDBACK TO AN E-MEETING PRESENTER

(75) Inventor: James Lee Lentz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 10/960,578

(22) Filed: Oct. 7, 2004

(65) Prior Publication Data

US 2006/0080614 A1   Apr. 13, 2006

(51) Int. Cl.
  *G06F 13/00* (2006.01)
  *G06F 15/00* (2006.01)
(52) U.S. Cl. ........................ 715/753; 715/802
(58) Field of Classification Search ........ 715/765–767, 715/745–751, 802–804, 753
  See application file for complete search history.

(56) References Cited

U.S. PATENT DOCUMENTS

| | | | |
|---|---|---|---|
| 6,134,531 | A | 10/2000 | Trewitt et al. |
| 6,418,473 | B1 | 7/2002 | St. Maurice et al. |
| 6,590,602 | B1 | 7/2003 | Fernandez et al. |
| 6,591,293 | B1 | 7/2003 | Poetzschke et al. |
| 2002/0087969 | A1 | 7/2002 | Brunheroto et al. |
| 2002/0178441 | A1 | 11/2002 | Hashimoto |
| 2003/0079218 | A1 | 4/2003 | Goldberg et al. |
| 2004/0174392 | A1* | 9/2004 | Bjoernsen et al. .......... 345/751 |
| 2005/0152523 | A1* | 7/2005 | Fellenstein et al. ..... 379/202.01 |

FOREIGN PATENT DOCUMENTS

WO   WO 01/20481   3/2001

OTHER PUBLICATIONS

*Noncollaborative Telepresentations Come of Age*, Gemmell, DJ et al., 1997.
*Sharing Views and Interactions with Single-User Application*, Greenberg, S., 1990.
*GSS for Presentation Support*, Davison, RM et al., 2000.
*Augmented Reality Kanji Learning*, Wagner, DB et al. Proceedings Second IEEE and International Symposium on Mixed and Augmented Reality 2003 P335-6, Proceedings the Second IEEE and International Symposium on Mixed and Augmented Reality, Tokyo, Japan, Oct. 7, 2003 to Oct 10, 2003.

* cited by examiner

*Primary Examiner*—Cao (Kevin) Nguyen
(74) *Attorney, Agent, or Firm*—Volel Emile; Mark S. Walker; Matthew Talpis (57) ABSTRACT

An apparatus, system and method of providing feedback to a presenter in an e-meeting in which visual information is being presented are provided. During presentation, the computer system of each participant is monitored to ensure that the window in which the visual information is being presented (i.e., the e-meeting window) is the window in focus. If the e-meeting window is not the window in focus, the presenter is notified. Generally, to notify the presenter, a status message is sent from the computer system on which the e-meeting window is not the window in focus to a server. There, status messages from different computer systems are combined together. The combined status message is then periodically sent to the presenter.

5 Claims, 10 Drawing Sheets

APPARATUS, SYSTEM AND METHOD OF PROVIDING FEEDBACK TO AN E-MEETING PRESENTER

BACKGROUND OF THE INVENTION

1. Technical Field

The present invention is directed to teleconferences. More specifically, the present invention is directed to an apparatus, system and method of providing feedback to an e-meeting presenter.

2. Description of Related Art

Due to recent trends toward telecommuting, mobile offices, and the globalization of businesses, more and more employees are being geographically separated from each other. As a result, more and more teleconferences are occurring at the work place.

A teleconference, as is well known, involves non-face-to-face interactions among participants. Particularly, a teleconference is a conference in which participants communicate with each other by means of telecommunication devices such as telephones or computer systems. Collaboration software, such as IBM Lotus Web conferencing, enables the participants to view and share applications, annotate documents, chat with other participants, or conduct an interactive white board session using their computer systems.

Face-to-face communications provide a variety of visual cues that ordinarily help in ascertaining whether a conversation is being understood or even being heard. For example, non-verbal behaviors such as visual attention and head nods during a conversation are indicative of understanding. Certain postures, facial expressions and eye gazes may provide social cues as to a person's emotional state, etc. Non-face-to-face communications are devoid of such cues.

As with any conversation or in any meeting, sometimes a participant might be stimulated by what is being communicated and sometimes the participant might be totally disinterested. Since in teleconferences in which Web conferencing equipment is used voice and images may be transmitted digitally, it would be advantageous to provide to a presenter feedback regarding participants' interest in a teleconference presentation.

SUMMARY OF THE INVENTION

The present invention provides an apparatus, system and method of providing feedback to a presenter in an e-meeting in which visual information is being presented. During presentation, the computer system of each participant is monitored to ensure that the window in which the visual information is being presented (i.e., the e-meeting window) is the window "in focus". If the e-meeting window is not the window "in focus", the presenter is notified. Generally, to notify the presenter, a status message is sent from the computer system on which the e-meeting window is "out of focus" to a server. There, status messages from different computer systems are combined together. Combined status messages are periodically sent to the presenter.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
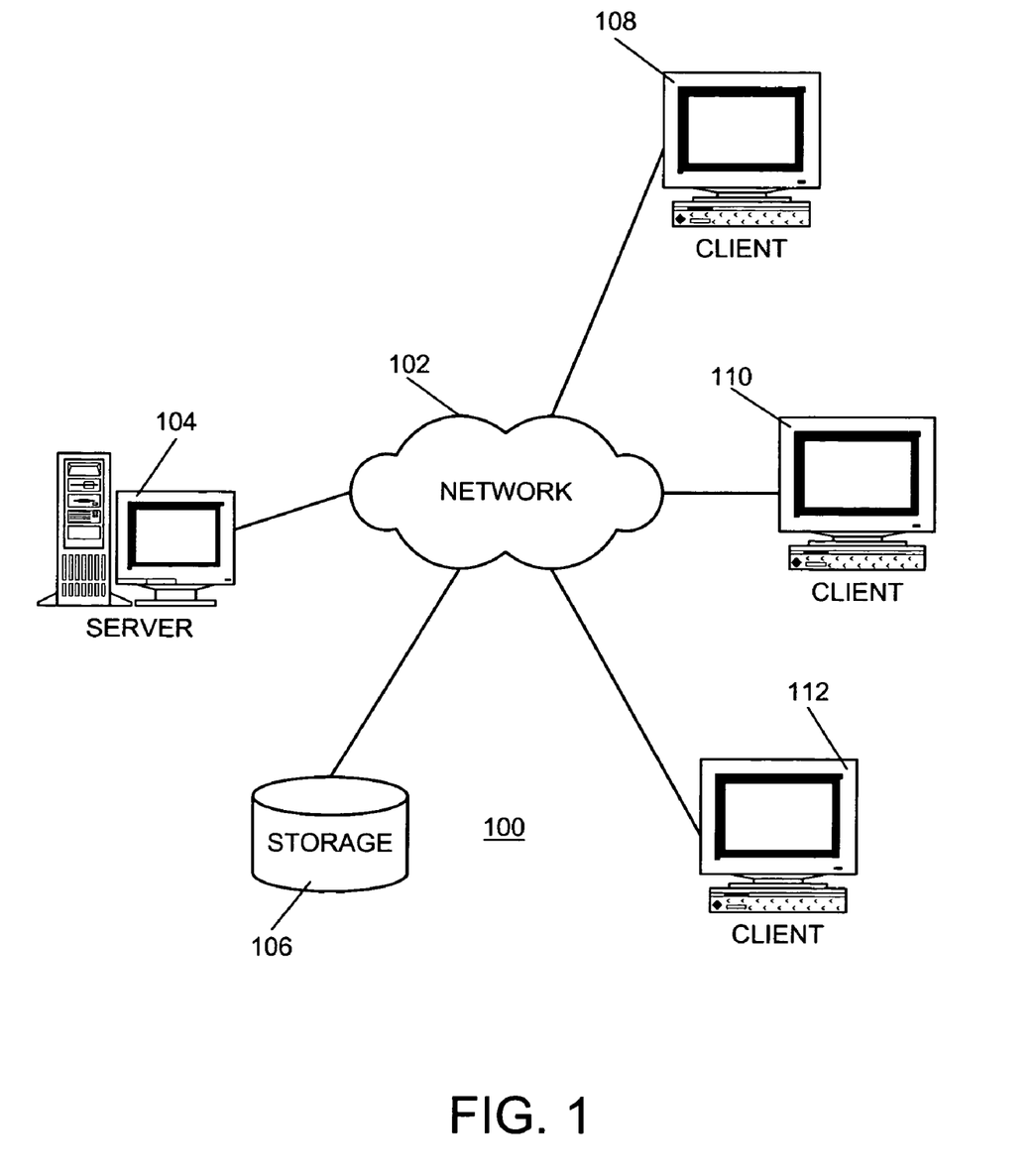
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
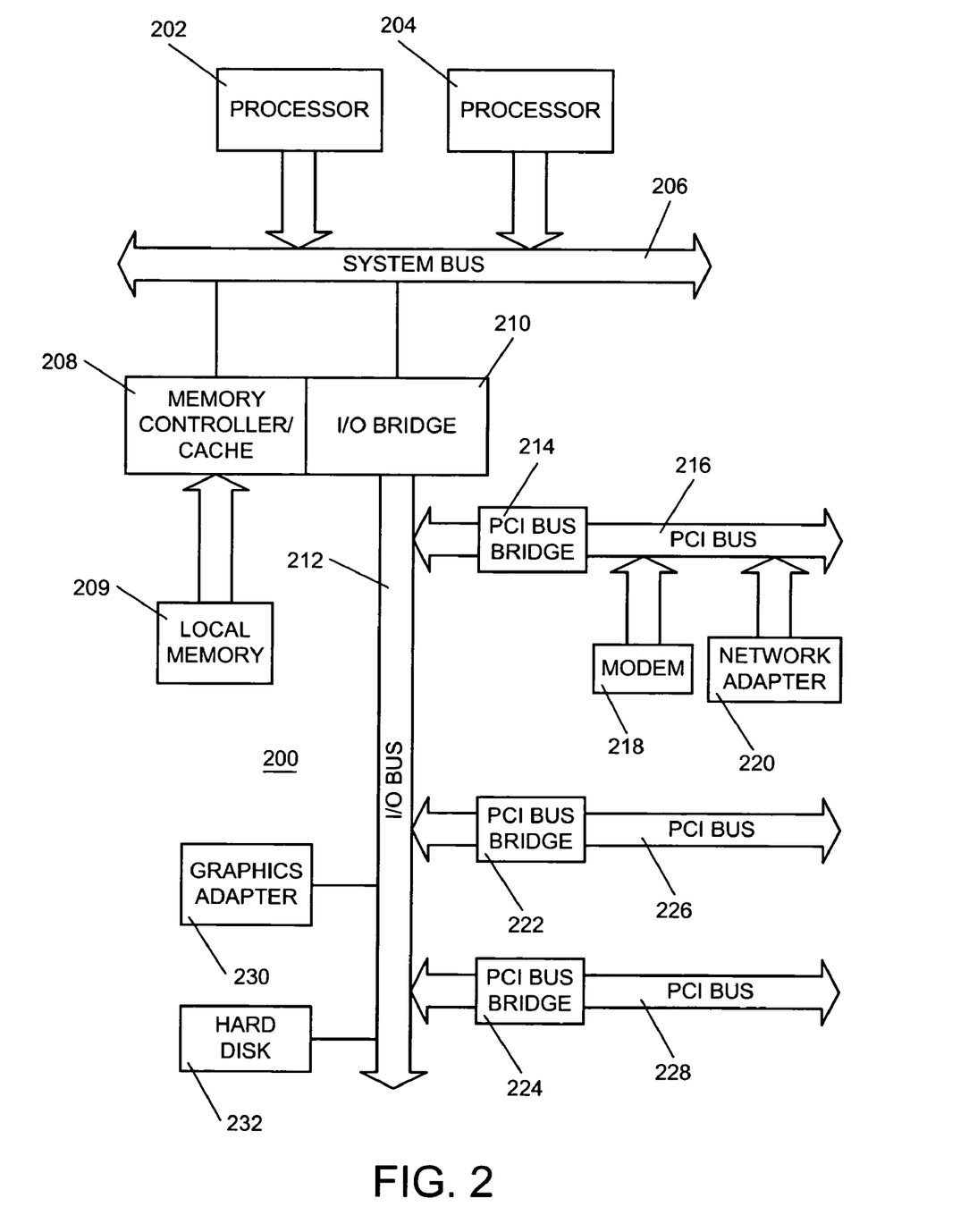
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. Input/output (I/O) bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or the Linux operating system.

Figure 3:
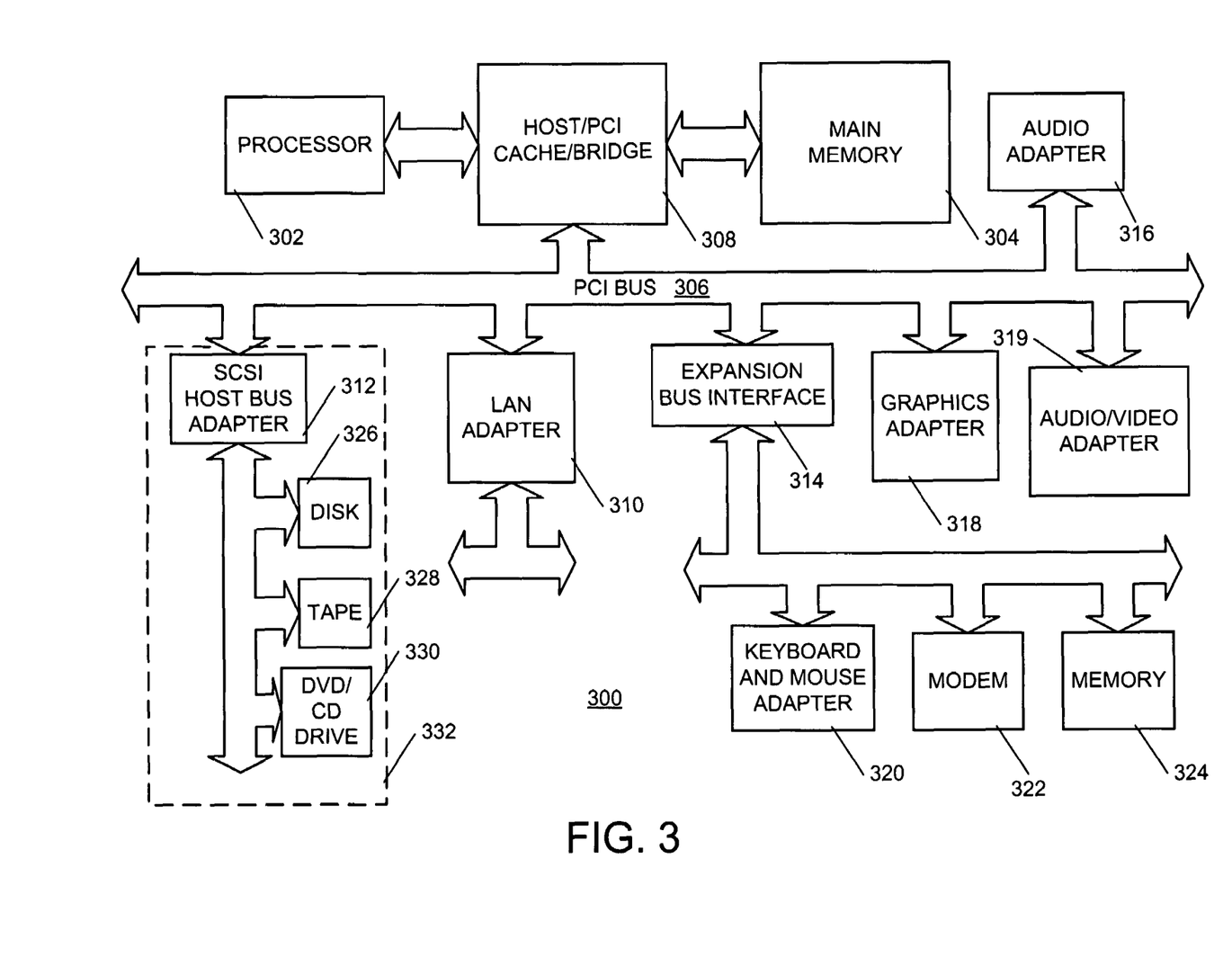
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a PCI local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, LAN adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and digital video disk/compact disk (DVD/CD) drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming environment such as Java may run in conjunction with the operating system and provide calls to the operating system from Java programs or applications executing on data processing system 300. "Java" is a trademark of Sun Microsystems, Inc. Instructions for the operating system, the object-oriented programming environment, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only-memory (ROM) (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus, system and method of providing feedback to a presenter regarding participants' interest in a teleconference presentation. The invention may reside on any data storage medium (i.e., floppy disk, compact disk, hard disk, ROM, RAM, etc.) used by a computer system. Further, the invention may be local to client systems 108, 110 and 112 of FIG. 1 or to the server 104 and/or to both the server 104 and clients 108, 110 and 112.

In carrying out a teleconference, each participant at each site may use a computer system equipped with speakers (not shown), microphone (not shown) and an audio adapter (not shown). The audio adapter may be used to generate audio signals representative of a user's speech captured by the microphone and for reproducing the speech of one or more remote conference participants through the speakers. Generating audio signals of a user's speech captured by a microphone and reproducing speech through speakers are well known in the art and therefore will not be explained.

An electronic meeting software may be executing on each participant's computer system. Any of a plurality of electronic meeting software packages may be used. For example, Microsoft's NetMeeting, a product of Microsoft, IBM's Lotus Web conferencing, a product of International Business Machines Corporation, GroupSystems, a product of Ventana Corporation, MeetingWorks® for Windows, a product of Enterprise Solutions Incorporated, or GroupSystems for Windows, a product of Millgate Resources etc. may be used.

As is customary, during the teleconference some visual materials may be presented. To do so, any one of a plurality of visual software presentation programs may be used. For example, the materials may be presented using Microsoft PowerPoint or IBM Lotus FreeLance Graphics. Obviously, PowerPoint is a product of Microsoft Corporation and Lotus FreeLance Graphics is a product of International Machines Corporation.

When a presenter is presenting visual materials, the electronic meeting software running on the computer system of the presenter may send the visual materials that appear on the presenter's computer system to an electronic meeting server. The server may in turn broadcast the materials to each one of the participants. For example, suppose client 108 is the computer system of the presenter and clients 110 and 112 are the computer systems of two participants in the meeting. Suppose further that server 104 is the electronic meeting server. Then, when the visual materials are displayed on client 108, the electronic meeting software running on client 108 may send the materials to server 104. Server 104 which itself may be running an electronic meeting software may in turn broadcast the materials to clients 110 and 112 for display.

In certain instances, a presenter may want to know the overall response and attentiveness of the participants to the presentation. This may be for a variety of reasons including to change the tone and tempo of the speech as well as the materials being presented in order to attract anew the attention of participants who may have lost interest in the speech. Two alternative approaches of gauging audience attentiveness and responses will be presented, an implicit approach and an explicit approach.

In all modern graphical operating systems, only one single window may be "in focus" at any given time. "In focus" means that the window is active and responds to user selections and key presses on the keyboard. In addition, this window may have a highlighted border and may be on top of the z-order (i.e., the stacking order) of the windows. The implicit approach makes use of the single-window-in-focus characteristic of all windowing based desktop environments.

Particularly, the present invention monitors the window in which the materials are being presented (i.e., the e-meeting window) to detect whether or not it is "in focus". If the e-meeting window is not the window in focus, the invention may send a message to the presenter. For example, when a participant logs into an e-meeting, the e-meeting window will generally be the window in focus. If, during the course of the meeting, the participant opens another window or interacts with a window other than the e-meeting window, the newly-opened window or the window with which the participant interacted will become the window in focus. Once the e-meeting window ceases to be the window in focus, the invention may send a message alerting the presenter that the participant has shifted focus away from the presentation. Note that it is assumed that if the e-meeting window is not the window in focus on a computer system of a participant, there is a high likelihood that the participant may not be paying attention to what is being presented.

Figure 4A:
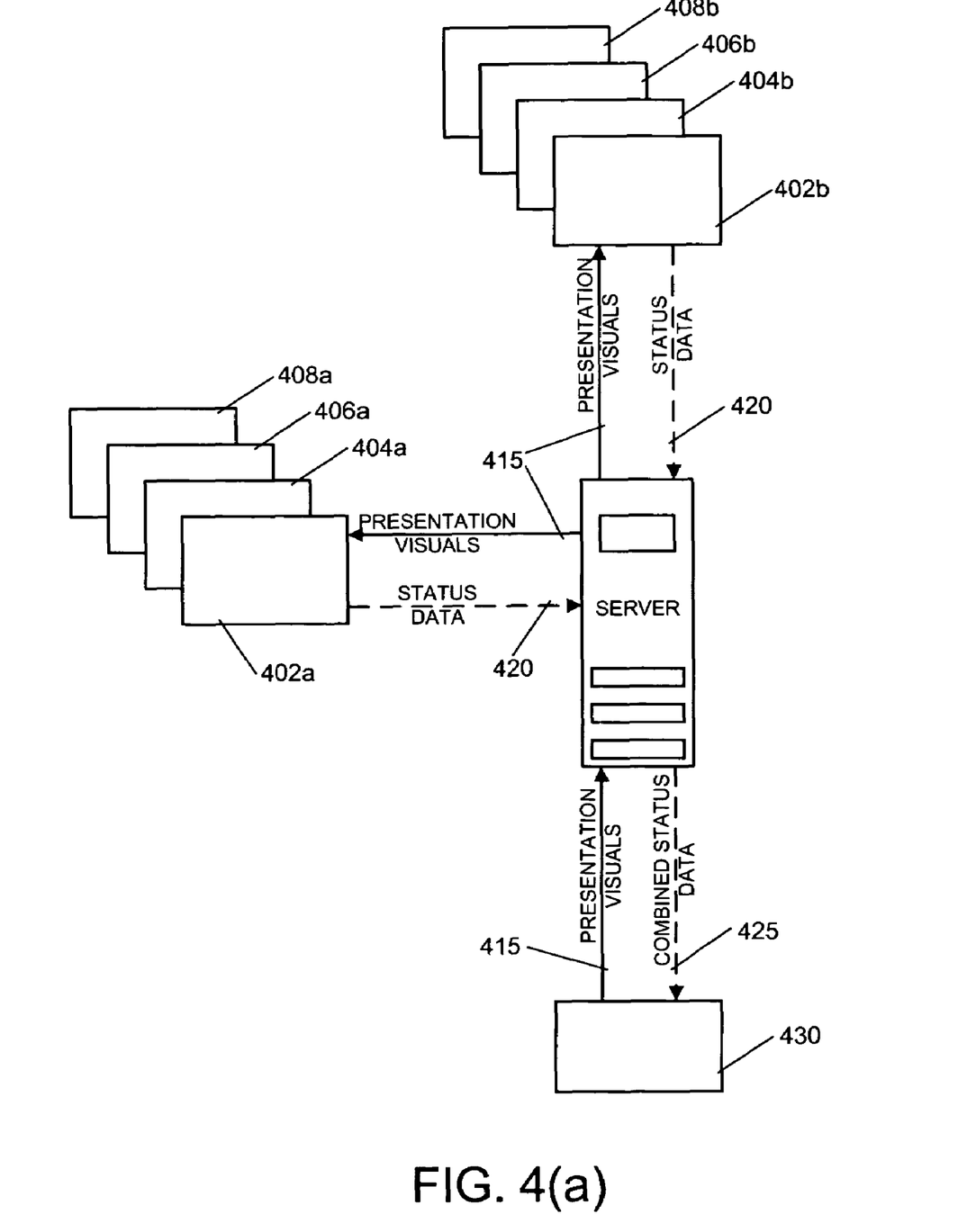
FIGS. 4a and 4b are conceptual views of the present invention.
Figure 4B:
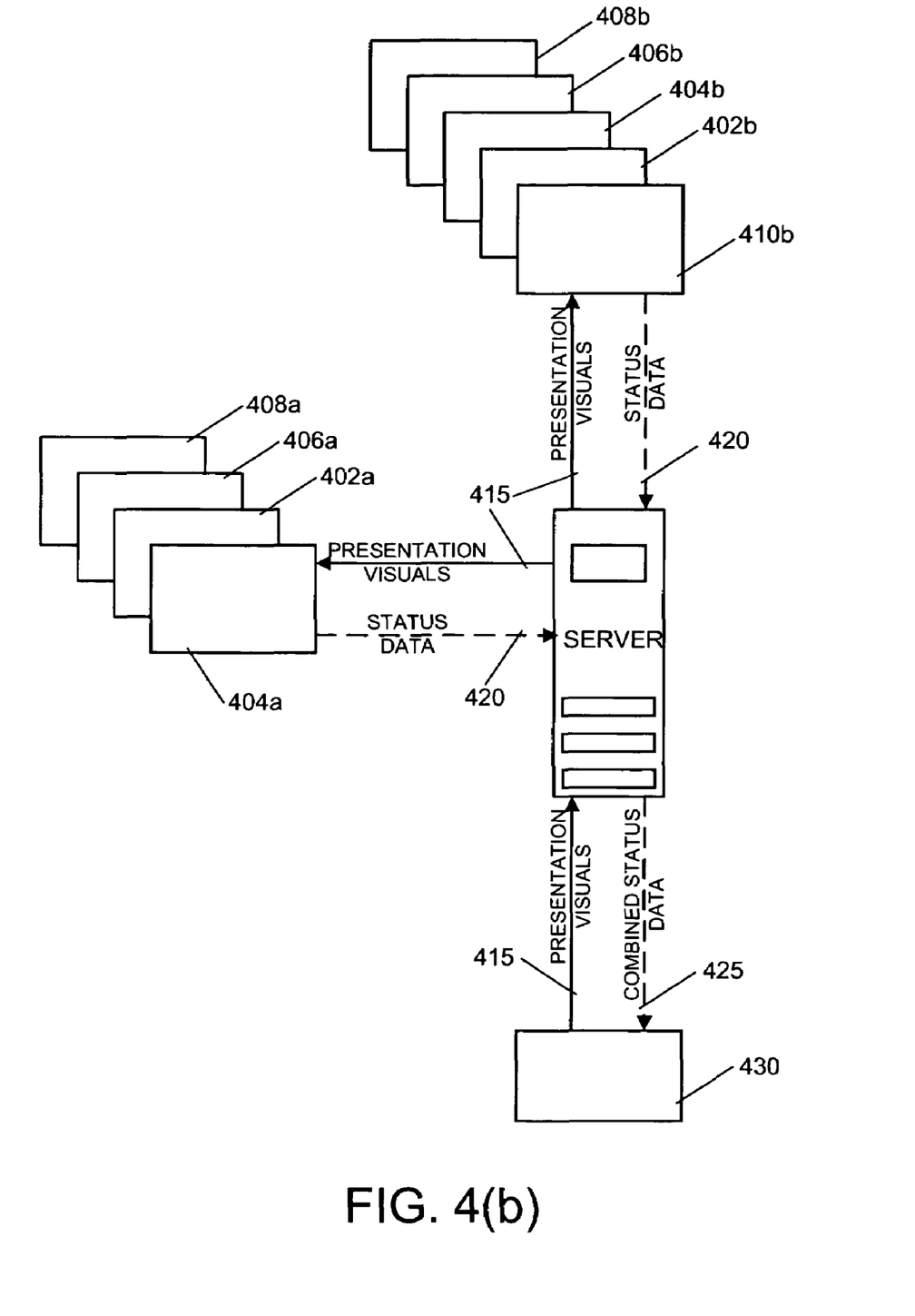

The implicit approach of the invention is represented in FIGS. 4a and 4b. Particularly, on the screen of the computer systems of the participants (i.e., clients 110 and 112 of FIG. 1) may be displayed at the inception of the presentation windows 402, 404, 406 and 408, denoted 402a, 404a, 406a and 408a for client 110 and 402b, 404b, 406b and 408b for client 112. Windows 402a and 402b represent the e-meeting window on clients 110 and 112 respectively while window 430 is the e-meeting window of client 108.

Presentation visuals 415 are data that flows from client 108 (i.e., the presenter's computer system) to server 104 and from server 104 to both clients 110 and 112. Status data 420, which may be data representing the window in focus, flows from clients 110 and 112 to server 104. There, the status data 420 of the clients are combined together to form combined status data 425 which is sent to client 108. This data, especially the data representing participants who do not have the e-meeting window in focus may be displayed in an unobtrusive area in window 430.

Since the e-meeting window (i.e., windows 402a and 402b) is the window in focus on both clients 110 and 112 of FIG. 4a, combined status data 425 need not be displayed in window 430 (i.e., the status data 420 need not be sent by clients 110 and 112). Alternatively, the status data 420 may periodically be sent whether or not the e-meeting windows 402a and 402b are in focus. Note however that in the preferred embodiment, the status data 420 is only transmitted when an e-meeting window changes state from "in focus" to "out of focus" and vice versa.

Thus, in FIG. 4b, which depicts computer screens on which the e-meeting windows 402a and 402b are no longer in focus on clients 110 and 112, the status data may be sent by both clients to server 104. Note that the loss of window focus may easily be implemented through an "on Blur" event handler.

In many programming languages, on Blur event handlers are used for a variety of reasons (e.g., Button, Checkbox, FileUpload, Layer, Password, radio, Reset, Select, Submit, Text, TextArea, Window). An on Blur event handler executes a specified JavaScript code or function, for example, on the occurrence of a blur event (i.e., when a window, frame or form element loses focus). This can be caused by a user interacting with the computer system outside of the window in focus, frame or form element, or by using the TAB key to cycle through various elements on the screen, or by a call to the window.blur method.

Hence, when a participant interacts with another window (see window 404a of FIG. 4b) on client 110 or when a participant opens a new window (see window 410b of FIG. 4b) on client 112, the e-meeting window will lose focus. At that moment, status data 420 may be sent to server 104 indicating that e-meeting windows 402a and 402b are no longer "in focus". The presentation server software running on server 104 may contain an aggregator component that receives these lost focus events from the various clients, aggregates the events over some time interval and sends the aggregated events (i.e., combined data 425) to client 108. By tracking when clients gain or lose focus, the aggregator may be enabled to track which clients in the audience have the window in focus, the total number of client windows in focus, or the proportion of client windows in focus.

Figure 5:
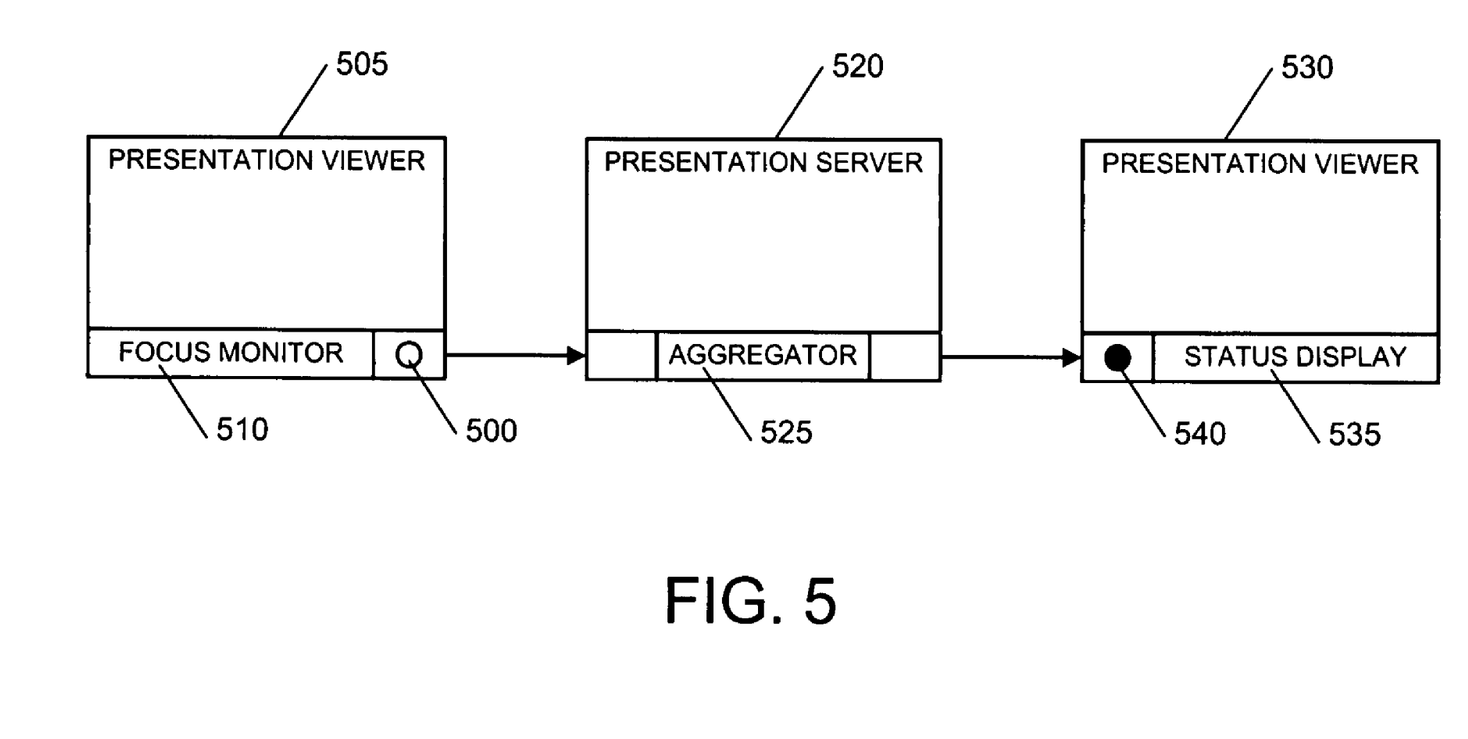
FIG. 5 is a conceptual depiction of the invention.

FIG. 5 is a conceptual depiction of the invention. Presentation viewer 505 may be a viewer on either client 110 or 112. Within presentation viewer 505 is a focus monitor 510 and a presenter button 500. The presenter 500 is used to indicate to the e-meeting server which one of the clients is the client system of the presenter. For example, if a participant asserts presenter button 500, the client of the participant becomes the client of the presenter. When the presentation viewer 505 loses focus (i.e., is not the window in focus), the focus monitor will send a status message to aggregator 525 on presentation server 520. As mentioned above, aggregator 525 may aggregate a plurality of status messages over a particular time interval from different presentation viewers 505 running on different clients. After the time interval has elapsed, the aggregator 525 may forward the aggregated status messages to presentation viewer 530. In this case, presentation viewer 530 runs on the presenter's client. The aggregated status messages may be displayed on status display 535 of the presentation viewer 530. Button 540 indicates that this client is the client of the presenter.

In the present embodiment, the aggregated status messages may be displayed at the status display 535 as a function of a percentage of the audience clients that have their e-meeting window in focus during the time span. Note, however, that aggregated status messages may as well be presented as a function of a percentage of the audience clients that do not have their e-meeting window in focus during the interval of time. Or, the aggregated status messages may be displayed as a number representing the audience clients that have or do not have their e-meeting window in focus.

The explicit approach requires overt audience participation to track attentiveness and responses to the presentation. That is, the e-meeting software running on clients 110 and 112 may contain one or more controls for providing feedback to the presenter. This could be a simple slider that participants may use to indicate how well they agree or disagree with what is being presented. Other types of responses may similarly be indicated (e.g., how well a participant understands the presentation). Alternatively, two or more responses may be indicated simultaneously by using a two-dimensional or multi-dimensional control.

The audience responses may be continuous (i.e., a participant may adjust the rating continuously as the presentation proceeds). The responses may be tied to particular slides in the presentation. The number of participants who actively provide ratings may serve as an index of attentiveness.

The explicit approach may also be readily combined with other mechanisms to provide feedback to the presenter. A "hand-raising" push-button on a participant's system could be used to signal that the participant has a question. The presenter may also use this device to get a "show of hands" feedback from the participants. The data gathered using either method may be aggregated in various ways. Statistics may be aggregated for the current slide, the current presentation, all presentations made by the presenter, by the organization etc. The display of feedback may include dispersion of ratings, measures of central tendency etc. Ratings may be anonymous or associated with the identities of members of the audience. Note that the identity of a participant may be obtained when the participant logs into the e-meeting.

To implement the explicit approach, a screen similar to the ones shown in FIG. 5 may be used. However, hidden focus monitor 510 may be replaced by an explicit user interface control or controls that each participant may use to rate, agree/disagree, show interest and understanding or any other attribute of the experience of the presentation. The value or values may then be transmitted via messages to server 104 at regular time intervals or as soon as a participant has used the control or controls. An aggregator may calculate statistics that are then transmitted to the presentation viewer 530 to be displayed in status display 535.

Figure 6:
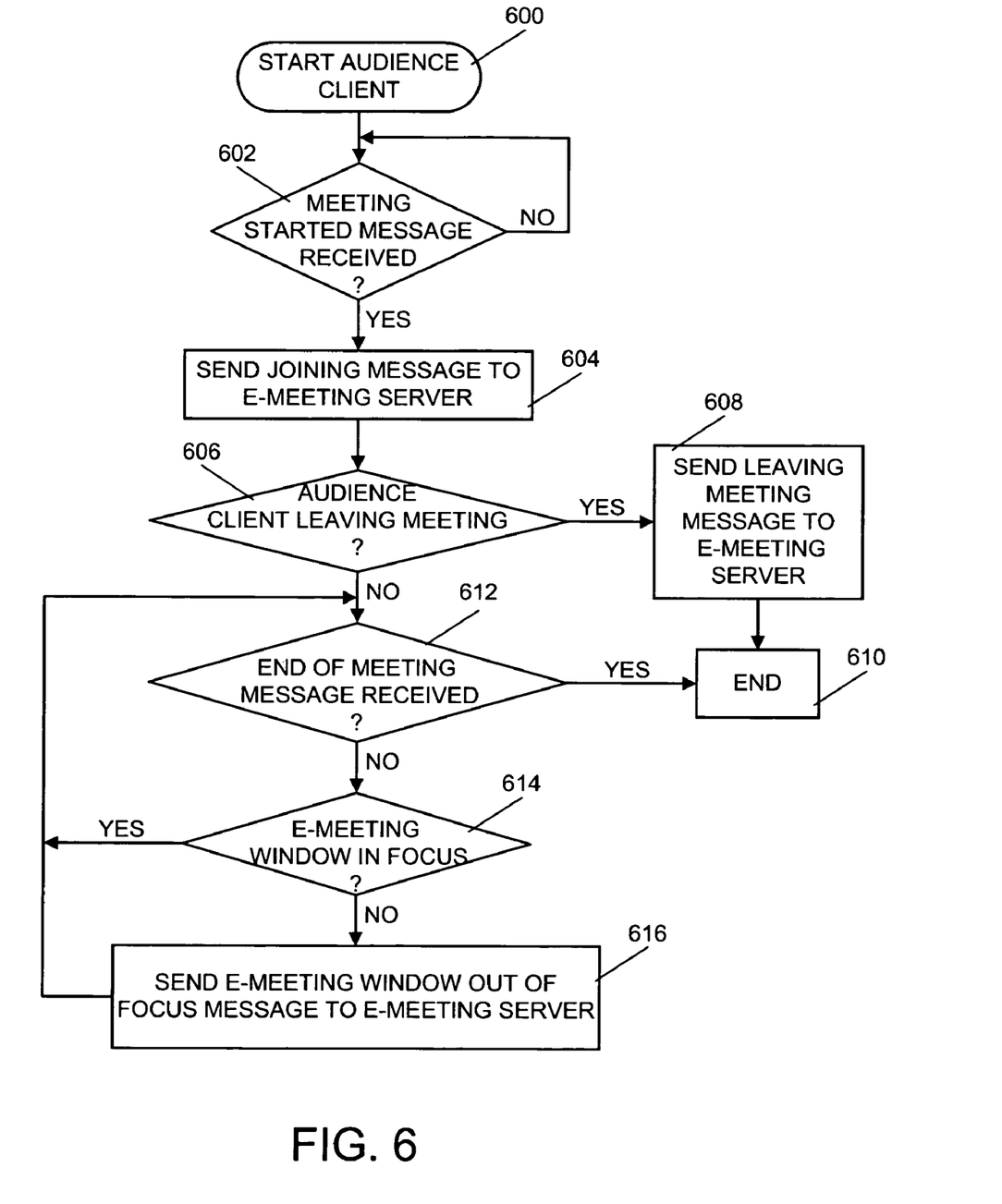
FIG. 6 is a flowchart of a process that may be used by an e-meeting client system of a participant in an e-meeting.

FIG. 6 is a flowchart of a process that may be used by an e-meeting client system of a participant. The process starts when the electronic meeting software is instantiated (step 600). Then, it is determined whether or not the "e-meeting started" message is received (step 602). If so, the client may send a "joining" message to the e-meeting server (step 604). In step 606, a check is made to determine whether the participant or audience client system is leaving the meeting. If so, a "leaving e-meeting" message is sent to the e-meeting server before the process ends (steps 608 and 610). If the audience client system is not leaving the e-meeting, another check is made to determine whether an "end of meeting" message has been received (step 612). If so, the process ends (step 610). If an "end of meeting" message has not been received, another check is made to determine whether the e-meeting window is in focus (step 614). If so, the process jumps back to step 612. If not, an "e-meeting window is out of focus" message is sent to the e-meeting server and the process jumps back to step 612 (step 616).

Figure 7:
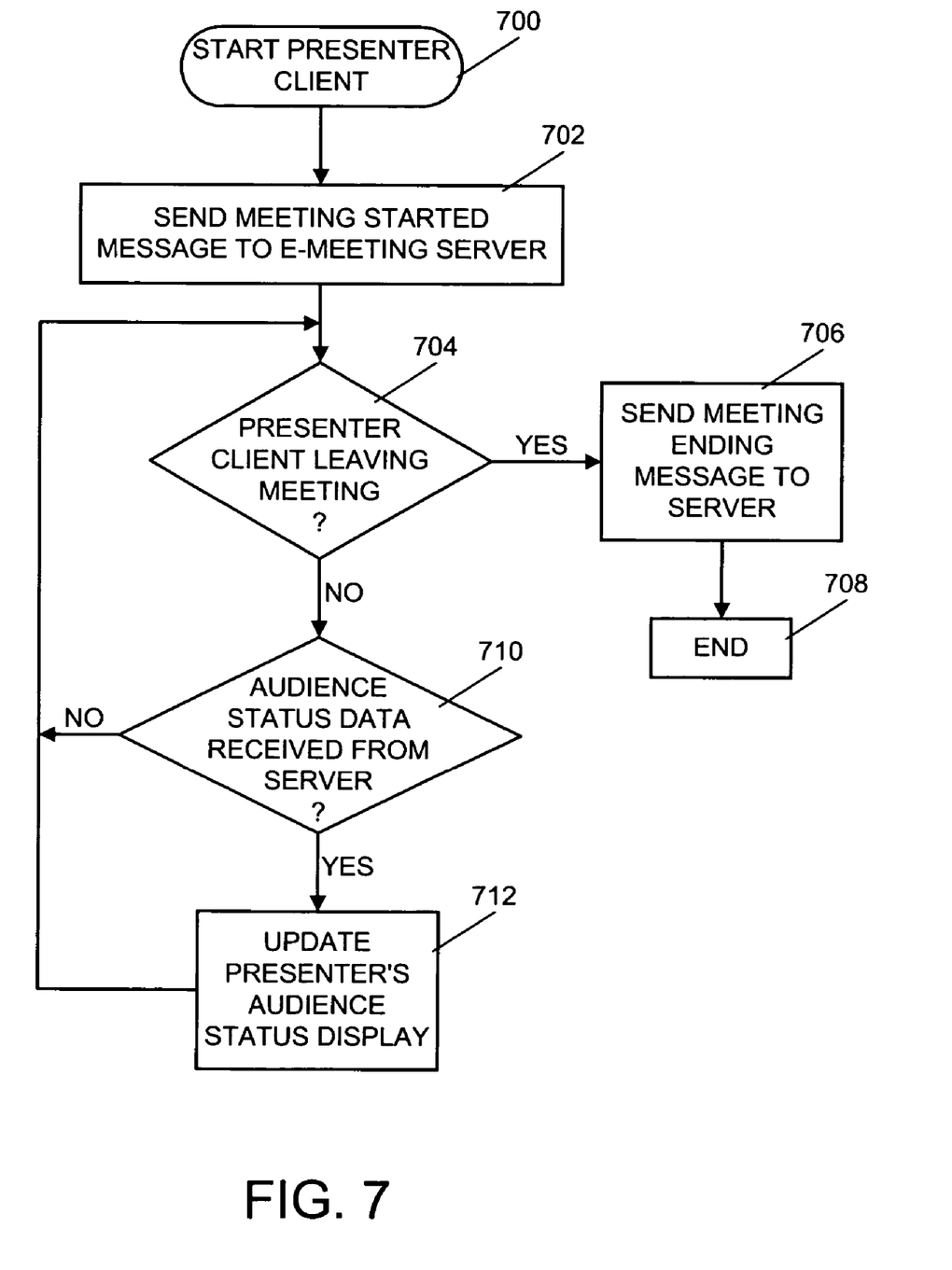
FIG. 7 is a flowchart of a process that may be used by an e-meeting client system of a presenter.

FIG. 7 is a flowchart of a process that may be used by an e-meeting client system of a presenter. The process starts when the electronic meeting software is instantiated on the client (step 700). Then, a "meeting started" message is sent to the e-meeting server (step 702). In step 704 a check is made to determine whether the presenter's client is leaving the e-meeting. If so, an "e-meeting ending" message is sent to the e-meeting server before the process ends (steps 706 and 708). If the presenter's client is not leaving the e-meeting, a check is made to determine whether "audience status data" is received from the e-meeting server (step 710). If not, the process jumps back to step 704. If so, the presenter's audience status display is updated and the process jumps back to step 704 (step 712).

Figure 8:
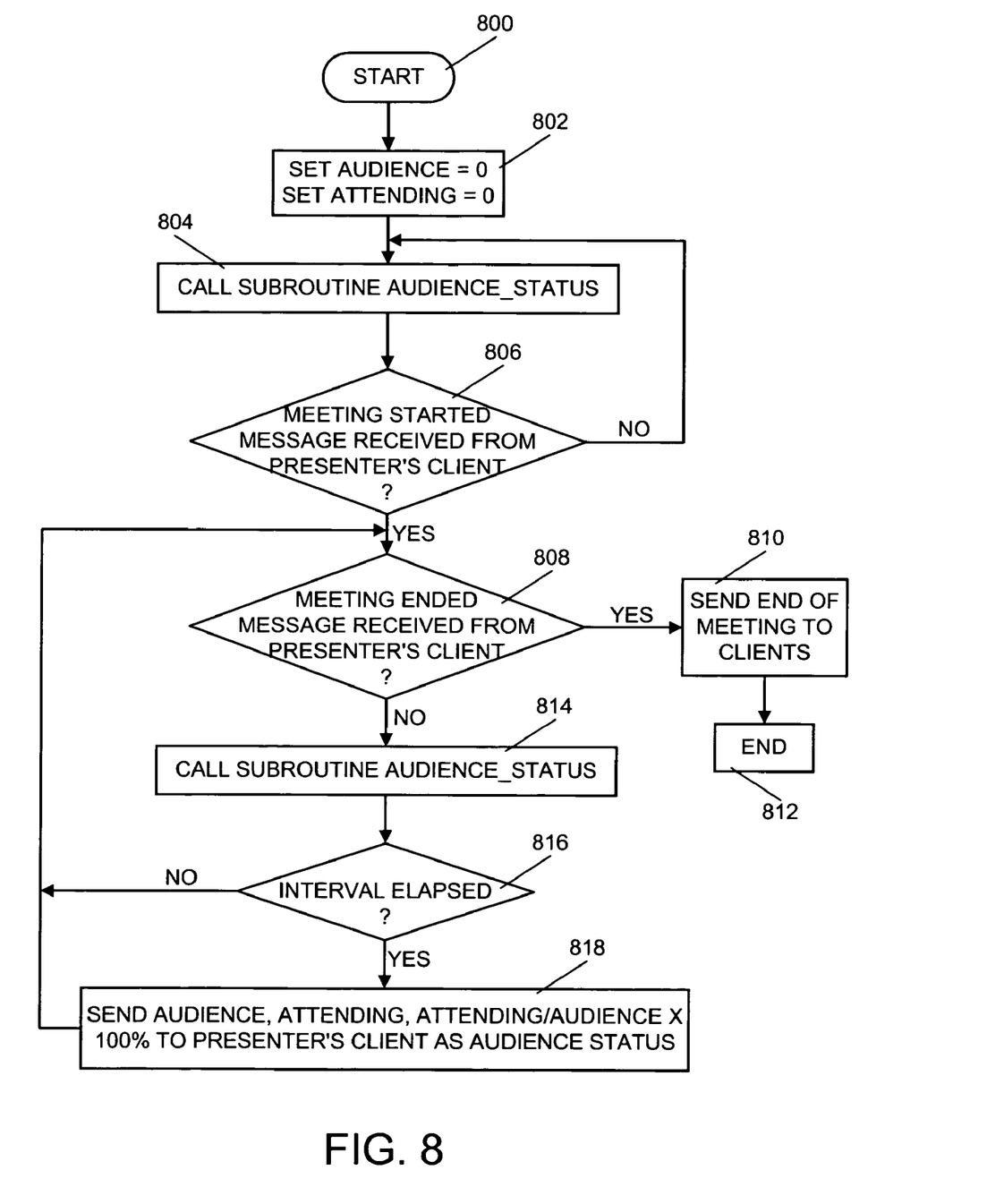
FIG. 8 is a flowchart of a process that may be used by an e-meeting server.

FIG. 8 is a flowchart of a process that may be used by an e-meeting server. The process starts when the electronic meeting software on the server is instantiated (step 800). At that point variables audience and attending are set to zero (0). After the variables are set to zero (0), subroutine audience_status (described below) is called (step 804). After the subroutine returns its result, a check is made to determine whether a "meeting started" message is received from the presenter's client system (step 806). If not, the process jumps back to step 804. If the "meeting started" message is received, another check is made to determine whether an "e-meeting ended" message is received from the presenter's client (step 808). If so, an "end meeting" message is sent to the clients of the participants and the process ends (steps 810 and 812). If the "e-meeting ended" message is not received, another call to the audience_status subroutine is made (step 814) After the proper interval of time has elapsed, data representing the number of participants (i.e., the audience variable), the number of attendees (i.e., participants who are still attending the meeting as illustrated by the attending variable) and the ratio or percentage of number of attendees to number of participants is sent to the presenter's client for display as audience status (step 818).

Figure 9:
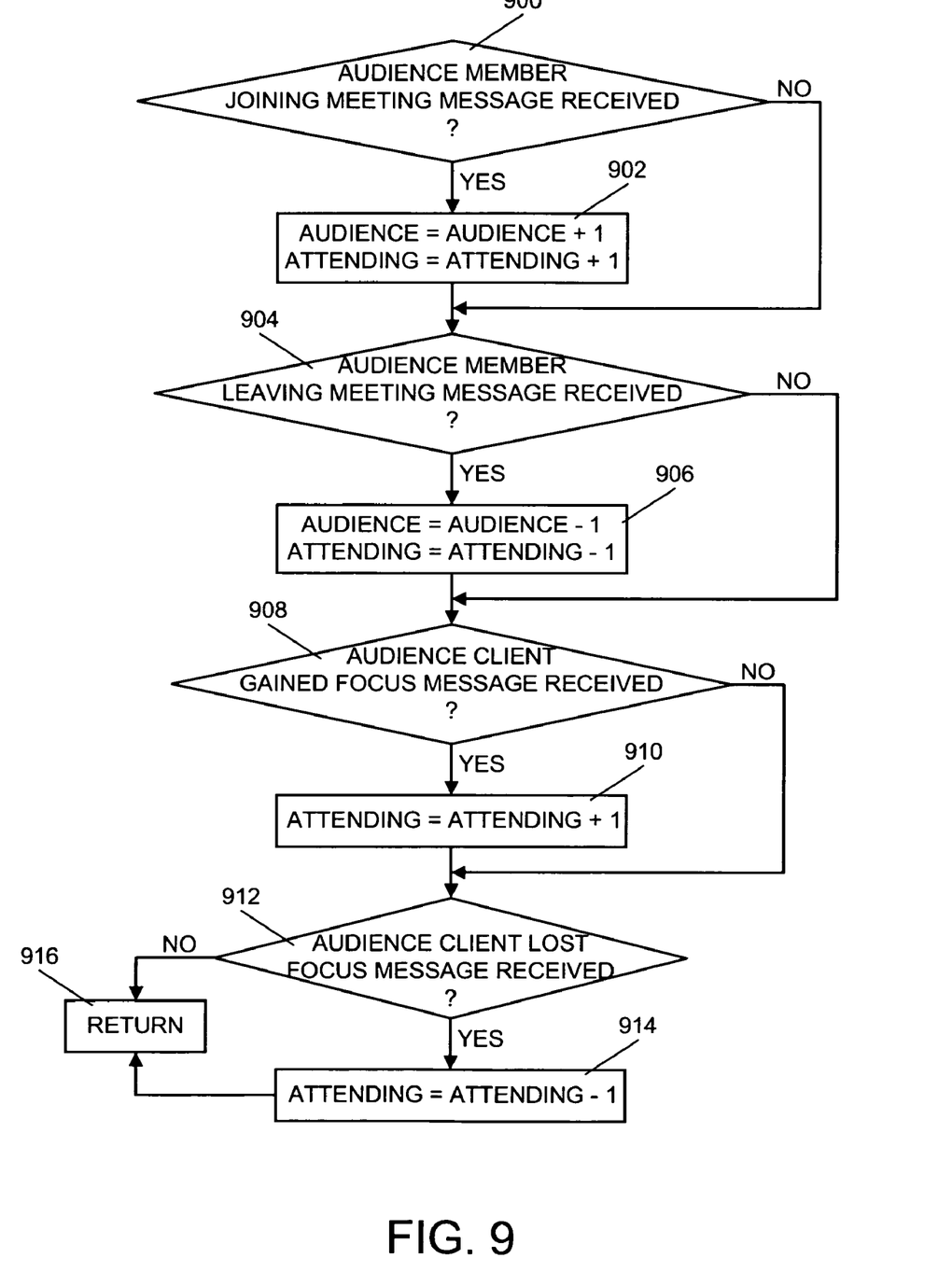
FIG. 9 is a flowchart of the audience_status subroutine.

FIG. 9 is a flowchart of the audience_status subroutine. When it is called, the audience_status subroutine checks to see whether an "audience member joining meeting" message is received by the server. If so, the value of both the audience and the attending variables is increased by one (steps 900 and 902). Then, another check is made to determine whether an "audience member leaving" message is received. If so, the value of both the audience and the attending variables is decreased by one (steps 904 and 906). Then, a check is made to determine whether an "audience client gained focus" message is received. If so, the value of the attending variable is increased by one (steps 908 and 910). Another check is made to determine whether an "audience client lost focus" message is received. If so, the value of the attending variable is decreased by one (steps 912 and 914). The value of the subroutine is then returned (step 916).

As shown above, the invention tracks how many and what percentage of the audience is attending the presentation. This can be done on a page by page basis. Particularly, the size of the audience and percentage attending is updated on the basis of an interval of time. Each time the presenter moves to a new Freelance or PowerPoint page in his or her presentation, the invention may run the AUDIENCE_STATUS subroutine to update the status. "The Interval Elapsed?" step in FIG. 8 (i.e., step 816) may be replaced with a "New Page Received?" to enable this capability on the server. To determine whether a NEW Page is received, the server may parse the data received from the presenter's client for "NEW PAGE", "NEXT PAGE" etc. since both Freelance and PowerPoint are organized by pages.

The advantage of this enhancement is that the attendance status could be saved on the server on a page-by-page basis. After the presentation is completed, the presenter could query the server to review whether and at what point he/she started to loose audience attention. If the identity of each attendee is stored with the window in focus information, this page-by-page status may be used to determine which parts of the presentation individuals may have seen or missed.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of providing feedback to a presenter in an e-meeting in which visual information is being presented to at least one participant, the at least one participant having a computer system with a monitor, the visual information being presented in a window on the monitor, the method comprising the steps of:

determining whether the window in which the visual information is being presented is the window in focus on the monitor; and notifying the presenter in response to determining that the window in which the visual information is being presented is not the window in focus on the monitor and not notifying the presenter otherwise, wherein the notifying step includes the steps of:

combining notifications from all participants in the e-meeting to form a combined notification if there is more than one participant in the e-meeting; and sending the combined notification to the presenter.

2. The method of claim 1 wherein the combining and sending steps are performed by a presentation server.

3. The method of claim 2 further including the steps of:

displaying feedback options to the participants;

enabling each participant to select at least one of the feedback options; and allowing the at least one selected feedback option to be sent to the presenter.

4. The method of claim 3 wherein the presentation server also prepares a statistical summary of the notifications.

5. The method of claim 4 wherein the statistical summary is used to determine percentage of participants that is disinterested in the presentation.

* * * * *